(12) United States Patent
Kim

(10) Patent No.: US 9,784,998 B2
(45) Date of Patent: Oct. 10, 2017

(54) METHOD FOR MANUFACTURING CURVED DISPLAY

(71) Applicant: TOVIS CO., LTD., Incheon (KR)

(72) Inventor: Yong Beom Kim, Incheon (KR)

(73) Assignee: TOVIS CO., LTD., Yeonsu-gu, Incheon (KR)

( * ) Notice: Subject to any disclaimer, the term of this patent is extended or adjusted under 35 U.S.C. 154(b) by 264 days.

(21) Appl. No.: 14/437,609

(22) PCT Filed: Oct. 22, 2013

(86) PCT No.: PCT/KR2013/009424
§ 371 (c)(1),
(2) Date: Apr. 22, 2015

(87) PCT Pub. No.: WO2014/065567
PCT Pub. Date: May 1, 2014

(65) Prior Publication Data
US 2015/0301390 A1 Oct. 22, 2015

(30) Foreign Application Priority Data

Oct. 26, 2012 (KR) .......... 10-2012-0119870
Oct. 21, 2013 (KR) .......... 10-2013-0125284

(51) Int. Cl.
*G02F 1/1333* (2006.01)
*G02F 1/1335* (2006.01)
*G02F 1/1339* (2006.01)

(52) U.S. Cl.
CPC ...... *G02F 1/133305* (2013.01); *G02F 1/1339* (2013.01); *G02F 1/133528* (2013.01)

(58) Field of Classification Search
CPC ............ G02F 1/1333; G02F 11/133; G02F 1/133305; G02F 1/133528; G02F 1/1339; G09F 9/20; G09F 9/35
See application file for complete search history.

(56) References Cited

FOREIGN PATENT DOCUMENTS

| JP | 07-301789 A | 11/1995 |
| JP | 2009-020168 A | 1/2009 |
| JP | 2010-014962 A | 1/2010 |
| JP | 2010181545 A † | 8/2010 |

(Continued)

*Primary Examiner* — Carl Arbes
(74) *Attorney, Agent, or Firm* — Novick, Kim & Lee, PLLC; Jae Youn Kim

(57) ABSTRACT

Provided is a method for manufacturing a curved display by which a display module that has a tap for electrical connection is manufactured into the curved display, the method including: a step of sealing a circumference of the display module excluding a part of the tap which projects outward from the display module with a sealing material having acid resistance; a step of performing masking by using a masking member to surround either a pair of left and right sides or a pair of upper and lower sides facing each other in the sealed display module; a step of etching the display module, excluding the masked part of the masked display module, into a preset thickness such that the thickness of the display module is decreased; a step of removing the masking member from the display module that is etched in the etching step; and a step of bending the display module from which the masking member is removed into the curved surface.

22 Claims, 12 Drawing Sheets

(56) References Cited

FOREIGN PATENT DOCUMENTS

| | | | | |
|---|---|---|---|---|
| JP | 2012063761 | A | † | 3/2012 |
| JP | 2012-141342 | A | | 7/2012 |
| KR | 20100025219 | A | † | 3/2010 |
| KR | 20120029090 | A | † | 3/2012 |
| KR | 10-2012-0051630 | A | | 5/2012 |
| KR | 1020120051630 | A | * | 5/2012 |
| KR | 10-2012-0079890 | A | | 7/2012 |
| KR | 20140037422 | A | † | 3/2014 |

\* cited by examiner
† cited by third party

METHOD FOR MANUFACTURING CURVED DISPLAY

TECHNICAL FIELD

The present invention relates to a method of manufacturing a curved display having a curved shape

BACKGROUND ART

Generally, displays are devices for representing images. These days, demand for flat displays such as liquid crystal displays, polymer light emitting displays and organic light emitting displays is rapidly increasing.

Such a flat display includes a pair of substrates and a liquid crystal layer disposed between the pair of substrates. The flat display produces images in such a way that light transmittance is controlled by intensity of electricity applied to the liquid crystal layer.

Recently, as the availability of flat displays is improved, technologies for manufacturing curved displays are being actively developed in order to use the flat display in various fields.

An example of technologies for manufacturing a curved display is disclosed in Korean Unexamined Patent Publication No. 10-2012-0051630, entitled "Method of manufacturing curved display panel".

The conventional method of manufacturing a curved display panel, which is designed to manufacture a curved display panel having a desired curved profile from a flat liquid crystal panel which includes upper and lower substrates made of glass and disposed to face each other and a liquid crystal layer provided between the upper and lower substrates, includes cutting outer surfaces of the upper and lower substrates to reduce thicknesses of the upper and lower substrates to predetermined thicknesses, and bending the upper and lower cut substrates into desired curved shapes and attaching transparent substrates made of glass or synthetic resin, which have the same shapes as the desired curved shapes, to the outer surfaces of the upper and lower cut substrates, respectively, by means of a transparent adhesive, so as to maintain the curved shape of the upper and lower cut substrates.

The conventional method may be used to manufacture a curved display panel in a relatively simple manner by cutting a panel and then attaching the cut panel to a transparent substrate which was previously bent into a curved shape.

In the conventional method of manufacturing a curved display panel, the entire surface of the panel is cut and thus regions of the panel to be gripped are reduced in thickness and, as such, the panel may be broken during bending thereof. As a result, productivity of curved panels may be reduced.

Furthermore, in the conventional method of manufacturing a curved display panel, when the panel is etched, a sealing material for preventing leakage of a liquid crystal layer contained between upper and lower substrates may be etched by an etchant and, as such, the etchant may be introduced between the upper and lower substrates, thus causing breakage of the panel.

In addition, since a conventional separate completed display panel or a ready-made display panel is provided with circuit boards called "taps" attached thereto, it is difficult to manufacture a curved display panel from the display panel.

DISCLOSURE

Technical Problem

Therefore, the present invention has been made in view of the above problems, and it is an object of the present invention to provide a method of manufacturing a curved display which enables improvement in manufacturing yield of a curved display and prevention of breakage of a curved display caused by etchant and which may enable easy manufacture of a curved display from an existing display panel.

Technical Solution

In order to accomplish the above objects, a method of manufacturing a curved display from a display module including taps for electrical connection, according to an aspect of the present invention includes applying acid resistive sealant to a circumference of the display module excluding the taps protruding from the display module to seal the circumference, masking a pair of opposite right and left sides or a pair of opposite upper and lower sides of the sealed display module with masking members so as to surround the pair of opposite sides, etching the display module excluding the masked portions to reduce a thickness of the display module to a predetermined thickness, removing the masking members from the etched display module, and bending the display module from which the masking members have been removed to have a curved surface.

Bending the display module to have the curved surface may be performed in such a way as to fit the display module in a curved cover member or to attach the display module to the curved cover module so as to bend the display module.

The sealant may be made of a material that is in a liquid or gel phase and cures under natural conditions after lapse of a certain period of time or by application of heat.

Masking the display module with the masking members may be performed in such a way that, when the pair of sides of the display module are provided with the taps, the pair of sides of the display module is surrounded by the masking members, together with the taps.

Each of the masking members may be an acid resistive masking tape having an adhesive layer.

Each of the masking members may include a first clamp for gripping a portion of one substrate of the first and second substrates, a second clamp for gripping a portion of the other substrate of the first and second substrates, and a fastening member for fastening the first and second clamps to each other.

In etching the display module, the predetermined thickness may be within a range of 0.1 mm to 0.5 mm.

The display module may include a polarizing film, and the method may further include removing the polarizing film prior to applying the acid resistive sealant.

The method may further include attaching the removed polarizing film to the display module again between removing the masking members and bending the display module.

The method may further include removing the sealant after removing the masking members.

Applying the sealant may be performed by adhering acid resistive sealing tape including an adhesive layer to portions of the display module to which the taps are attached or to which the sealant is applied and then applying the sealant to the circumference of the display module.

A method of manufacturing a curved display from a display module including taps for electrical connection, according to another aspect of the present invention includes removing the taps from the display module, firstly applying acid resistive sealant to a circumference of the display module from which the taps have been removed, firstly etching outer surfaces of the display module to which the sealant has been firstly applied to reduce a thickness of the display module to a predetermined thickness, removing the firstly applied sealant from the firstly etched display module and attaching the taps to the display module, secondly applying sealant to the circumference of the display module to which the taps are attached, masking a pair of opposite right and left sides or a pair of opposite upper and lower sides of the secondly sealed display module with masking members so as to surround the pair of opposite sides, secondly etching the display module excluding the masked portions to reduce a thickness of the display module to a predetermined thickness, removing the masking members from the secondly etched display module, and bending the display module from which the masking members have been removed to have a curved surface.

Bending the display module to have the curved surface may be performed in such a way as to fit the display module in a curved cover member or to attach the display module to the curved cover module by means of adhesive so as to bend the display module.

The sealant used in the first and second application may be a material that is in a liquid or gel phase and cures under natural conditions after lapse of a certain period of time or by application of heat.

Masking the display module with the masking members may be performed in such a way that, when the pair of sides of the display module are provided with the taps, the pair of sides of the display module is surrounded by the masking members, together with the taps.

Each of the masking members may include a first clamp for gripping a portion of one of the first and second substrates, a second clamp for gripping a portion of the other of the first and second substrates, and a fastening member for fastening the first and second clamps to each other.

Each of the masking members may be an acid resistive masking tape having an adhesive layer.

In firstly etching the display module, the predetermined thickness may be within a range of 0.6 mm to 1.1 mm.

In secondly etching the display module, the predetermined thickness may be within a range of 0.1 mm to 0.5 mm.

The display module may include a polarizing film, and the method may further include removing the polarizing film prior to firstly applying the acid resistive sealant.

The method may further include attaching the removed polarizing film to the display module again between removing the masking members and bending the display module.

The method may further include removing the secondly applied sealant after removing the masking members.

Secondly applying the sealant may be performed by adhering acid resistive sealing tape including an adhesive layer to portions of the display module to which the taps are attached or to which the sealant is applied and then applying the sealant to the circumference of the display module.

Advantageous Effects

According to the present invention, a curved display may be easily manufactured from a display module separated from a ready-made product or a completed product including taps attached thereto, and an etching operation is performed after a display module is masked at portions thereof so as to maintain the initial thickness of the portions of the display module, and, as such, breakage of the display module occurring when the display module is bent into a curved shape is prevented, thus improving manufacturing yield of a display.

Furthermore, since a sealing material is prevented from being etched by an acid resistive sealing element upon etching, it may be possible to prevent breakage of a display module caused by infiltration of an etchant.

In addition, since an etching operation for reducing a thickness of a display module is performed several times, a curved display having uniform surfaces may be manufactured.

DESCRIPTION OF REFERENCE NUMERALS

Figure 1:
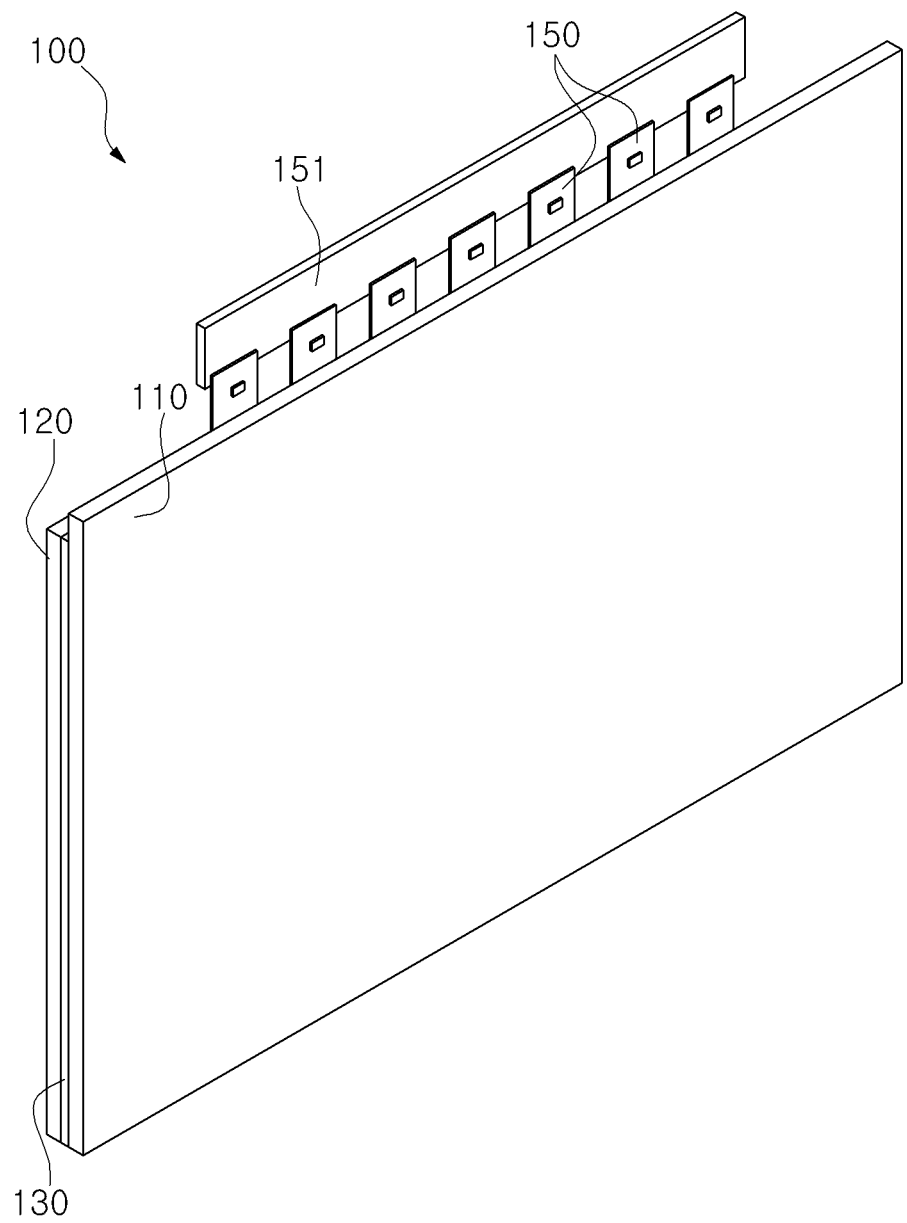
FIG. 1 is a perspective view schematically illustrating a display module used in a method of manufacturing a curved display according to a first embodiment of the present invention.

100: display panel
110: first substrate

120: second substrate
150: tap
151: circuit board
160: sealant
165: sealing tape
170: masking member
173: fastening member
174: airtight pad
t: thickness of display module

BEST MODE

Hereinafter, an embodiment of the present invention will be described with reference to the accompanying drawings.

The present invention is directed to a method of manufacturing a curved display by preparing a ready-made display module 100, etching the display module 100 to reduce a thickness of the display module 100, and bending the etched display module 100 to have a curved shape.

The ready-made display module 100 may be a display module 100 removed from a completed display product.

As illustrated in FIG. 1, the display module 100 may be an LCD panel which includes a first substrate 110, a second substrate 120, and a liquid crystal layer 130 disposed between the first substrate 110 and the second substrate 120. The LCD panel may include taps 150 adapted to allow for electrical connection to the LCD panel.

When one of the first substrate 110 and the second substrate 120 is a thin film transistor substrate, the other of the first substrate 110 and the second substrate 120 may be a color filter substrate. The liquid crystal layer 130 may be made of polymer which is oriented in a vertical or horizontal direction.

The color filter substrate may have a laminate structure in which a plurality of filters having various functions are laminated. A sealing material 135 may be disposed between the first substrate 110 and the second substrate 120 to block the liquid crystal layer 130 from leaking to the outside.

The taps 150 may be electrodes electrically connected to one of the first substrate 110 and the second substrate 120, that is, the substrate serving as the thin film transistor substrate. The taps 150 may be configured to have a film shape capable of being flexibly bent, and may be provided with ICs mounted thereon.

The taps 150 may include circuit boards 151 provided at distal ends of the electrodes, which include various semiconductors and electric elements for controlling the thin film transistor substrate.

The display module 100 may be configured into a rectangular shape in which right and left vertical sides have a smaller length than that of upper and lower horizontal sides.

In this embodiment, although the display module 100 is described as being an LCD, the display module 100 may also be a plasma display panel, an OLED, a PLED and the like.

In this specification, the term "side" refers to a marginal edge when it is viewed from the front, and also refers to peripheral lateral surfaces including the marginal edge when viewed in a perspective view.

The display module 100 may further include a polarizing film (POL; not shown). The polarizing film may be adhesively adhered to the first substrate 110 or the second substrate 120, or may be provided at the display module 100 as a laminated structure.

First Embodiment

A method of manufacturing a curved display according to a first embodiment of the present invention includes preparing a ready-made display module 100, and removing taps 150 from the display module 100. When a first substrate 110 or a second substrate 120 includes a polarizing film attached thereto, the polarizing film is also removed together with the taps 150.

Figure 2A:
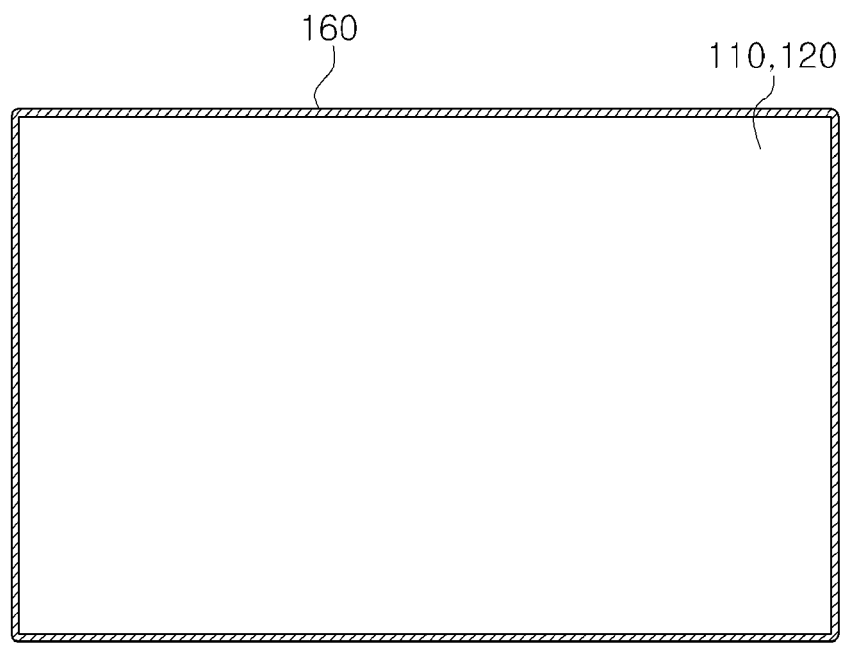
FIG. 2(a) and FIG. 2(b) are a front view and a sectional side view illustrating a display module to which sealant is firstly applied in the method of manufacturing a curved display according to the first embodiment of the present invention.
Figure 2B:
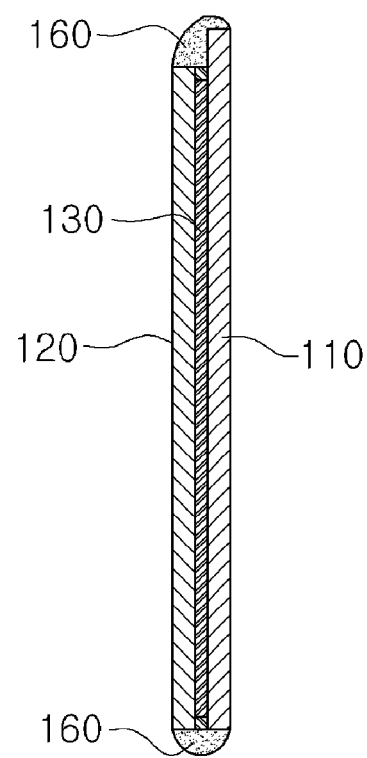

As illustrated in FIG. 2(a) and FIG. 2(b), in order to block extraneous substances, for example, etchant used in an etching process from infiltrating between the first substrate 110 and the second substrate 120, a first sealing operation is performed in such a way as to apply a sealant 160 to a circumference of the display module 100 from which the taps 150 and the polarizing film have been removed.

More specifically, the first sealing operation may eliminate problems that a sealing material 135 for sealing a liquid crystal layer 130 disposed between the first substrate 110 and the second substrate 120 is etched by etchant and thus the etchant infiltrates between the first substrate 110 and the second substrate 120, thus breaking the liquid crystal layer 130 and a circuit therebetween.

The sealant 160 may have acid resistance to prevent the sealant from being etched by the etchant. Furthermore, the sealant 160 may be a material that is in a liquid or gel phase at ambient temperature but cures upon application of heat or after lapse of a certain period of time under natural conditions.

The sealant 160 may be embodied as an ultraviolet sealant (UV sealant) having acid resistance.

Figure 3:
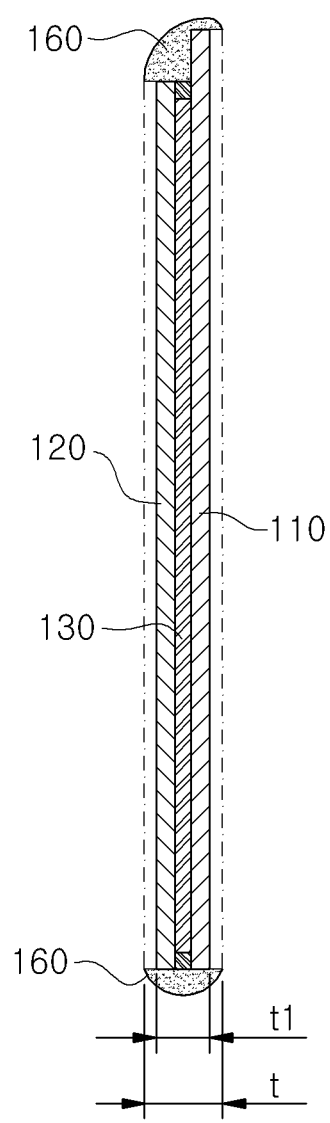
FIG. 3 is a sectional side view illustrating the display module which is firstly etched in the method of manufacturing a curved display according to the first embodiment of the present invention.

As illustrated in FIG. 3, after completion of the first sealing operation, a first etching operation is performed to reduce a thickness (t) of the sealed display module 100.

In the first etching operation, the entire outer surfaces of the first substrate 110 and the second substrate 120 are etched by chemical action of etchant and thus the thickness of the display module 100 is reduced to a predetermined thickness (t1).

In the first etching operation, the predetermined thickness (t1) may be within a range of 0.6 mm to 1.1 mm. If the predetermined thickness (t1) is less than 0.6 mm, the etched surfaces may become uneven because the display module 100 is etched too quickly.

Meanwhile, if the predetermined thickness (t1) exceeds 1.1 mm, an etched thickness is too small and thus a thickness to be etched in a second etching operation is too much, thus making the resulting etched surface uneven.

Figure 4:
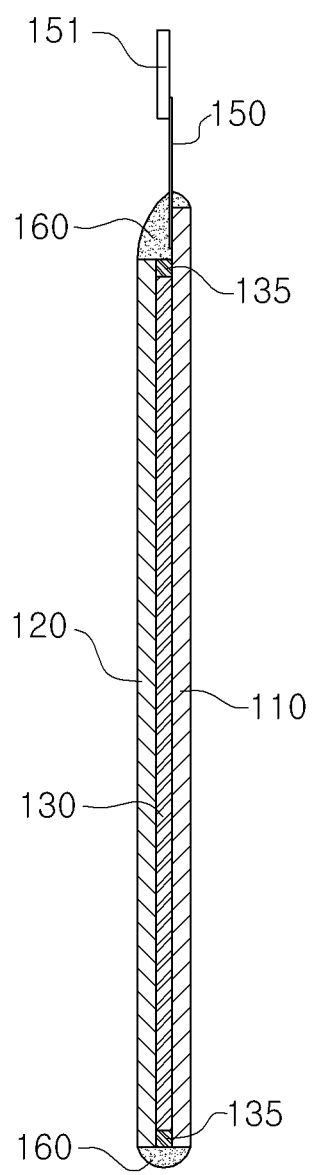
FIG. 4 is a sectional side view illustrating the display module to which taps are attached and to which sealant is secondly applied in the method of manufacturing a curved display according to the first embodiment of the present invention.

As illustrated in FIG. 4, after the display module 100 is etched in the first etching operation, the taps 150 removed from the display module 100 are again attached to the display module 100.

After the taps 150 are attached to the display module 100, a second sealing operation is performed in such a manner as to provide the sealant 160 to the circumference of the display module 100 again in order to block contaminants, for example, etchant used in an etching process from infiltrating between the first substrate 110 and the second substrate 120.

In this operation, the sealant 160 may be the same sealant 160 as that used in the first sealing operation. In the second sealing operation, the circumference of the display module 100 may be entirely or partially provided with the sealant 160.

The sealant 160 may be provided at the circumference of the display module 100 excluding the taps 150 protruding from the display module 100.

The sealant 160 may include a sealing tape 165. The sealing tape 165 may be made of material having acid resistance, and may include an adhesive layer to allow easy attachment to or detachment from the display module 100.

The sealing tape 165 may be embodied as a masking tape which will be described later.

The sealing tape 165 may be provided at the display module 100 in such a way that, before the display module 100 is sealed, the sealing tape 165 is first detachably adhered to the region of the display module 100 at which the taps 150 are attached or the sealant 160 will be provided, and then the sealant 160 is applied thereto (see FIG. 4).

When the sealant 160 is applied after adhesion of the sealing tape 165, the sealant 160 may be easily adhered to the display module 100 and airtightness of an uneven surface of the display module 100 may be further improved.

Figure 5:
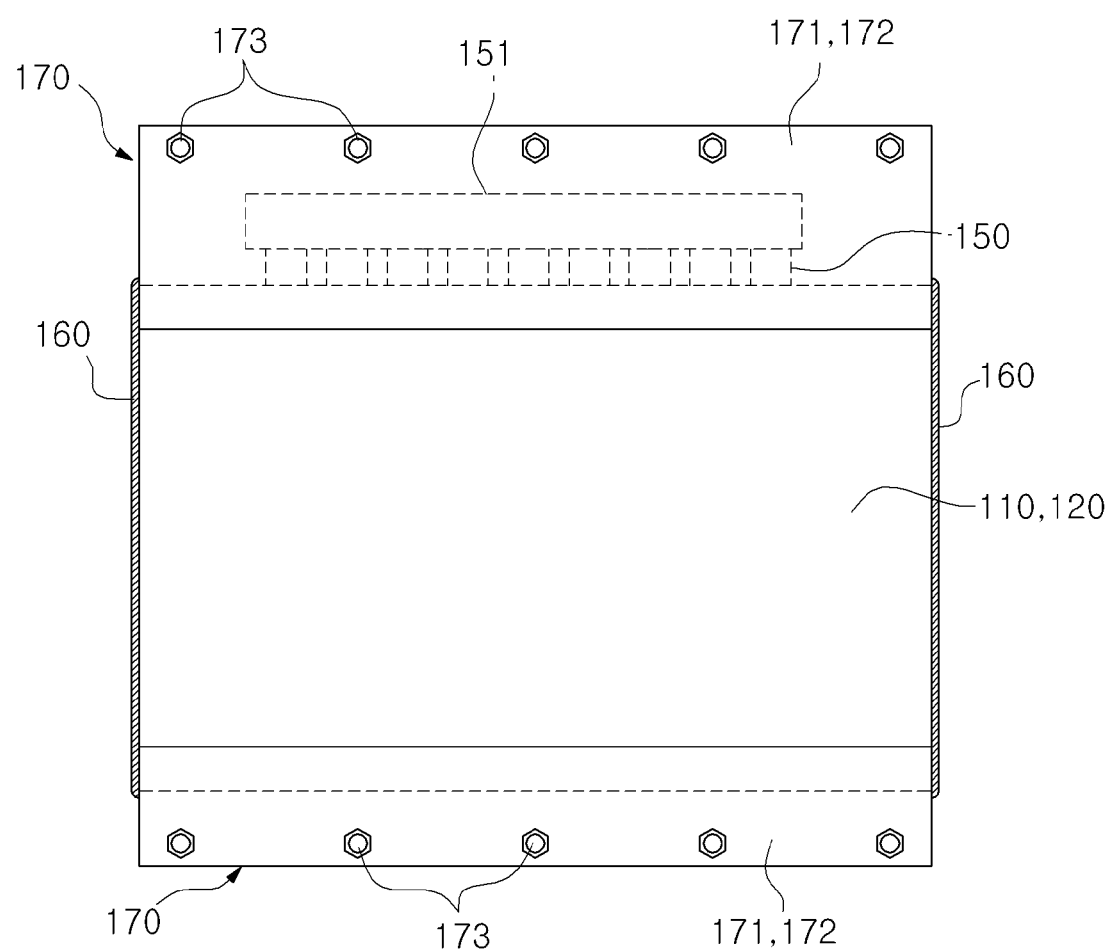
FIG. 5 is a front view illustrating the display module which is masked in the method of manufacturing a curved display according to the first embodiment of the present invention.
Figure 6:
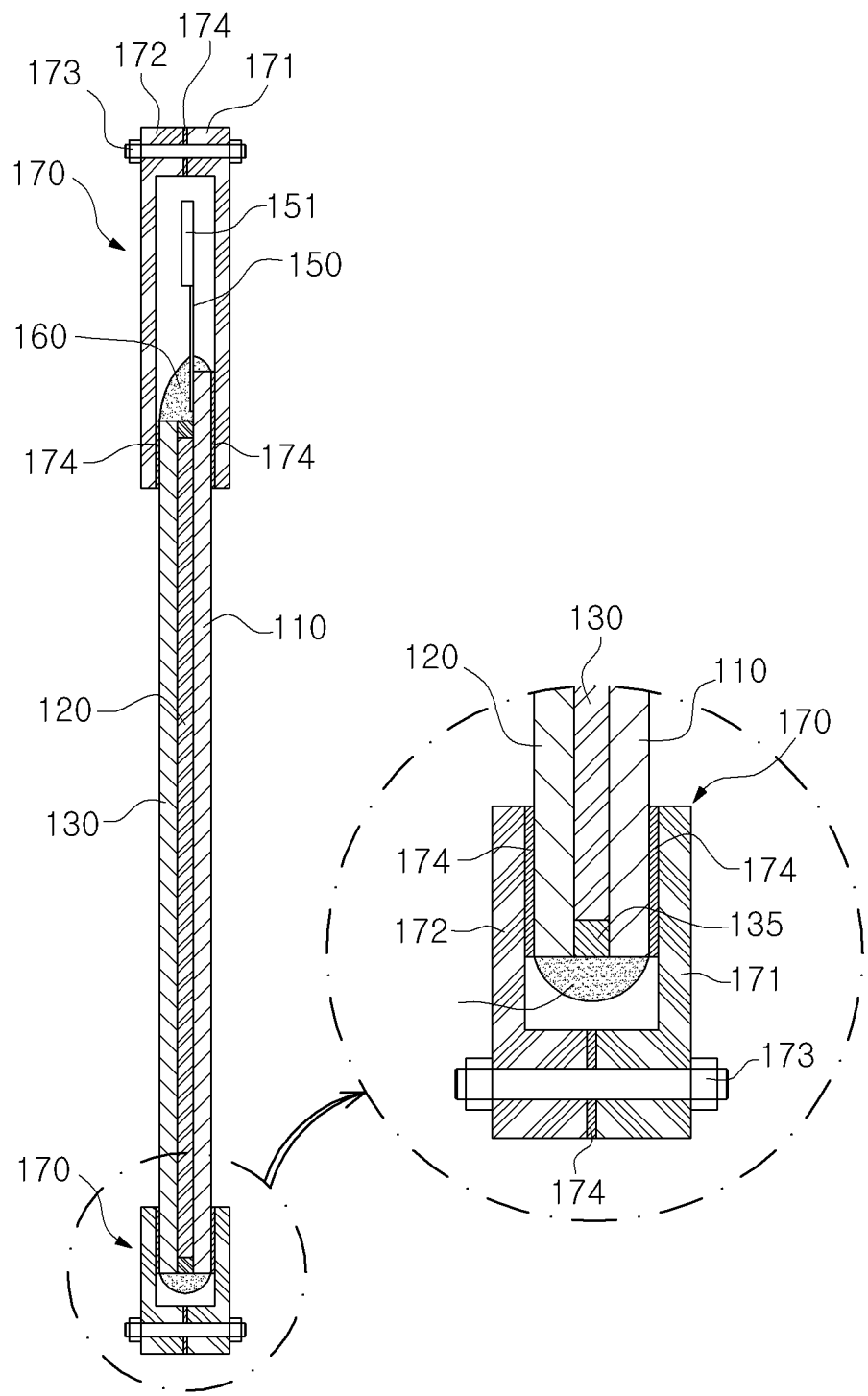
FIG. 6 is a sectional side view illustrating the display module which is masked in the method of manufacturing a curved display according to the first embodiment of the present invention.

As illustrated in FIGS. 5 and 6, after completion of the second sealing operation, a masking operation using masking members 170 is performed in such a way that the masking members 170 partially surround a pair of upper and lower sides or a pair of right and left sides of the display module 100, respectively, when the display module 100 is viewed from the front.

When the taps 150 are attached to the sides to be masked, the sides may be surrounded together with the taps 150.

In the first embodiment, the masking operation is performed at the side of the display module 100 at which the taps 150 are attached and the opposite side, that is, at the pair of upper and lower sides of the display module 100 when the display module 100 is viewed from the front.

The masking members 170 used in the masking operation may be embodied as acid resistive masking tapes that are detachably adhered in a detachable manner, or may be embodied as jigs for fixing the display module 100 to an etching apparatus which will be used in a subsequent etching operation.

When the masking members 170 are acid resistive masking tapes, the acid resistive masking tapes may include adhesive layers that allow the masking tapes to be easily adhered to or detached from the display module 100.

In this embodiment, the masking members 170 are embodied as jigs for clamping the display module 100. Each jig may include a first clamp 171, a second clamp 172, and fastening members 173.

The first clamp 171 may be configured to surround one edge of one side surface of the display module 100 while the second clamp 172 may be configured to surround one edge of the other side surface of the display module 100, as viewed in a perspective view.

The fastening members 173 may couple the first clamp 171 surrounding one edge of one side surface of the display module 100 and the second clamp 172 surrounding one edge of the other side surface of the display module 100 to each other.

In this case, airtight pads 174 for blocking infiltration of contaminants may be disposed between contact surfaces of the first clamp 171 and the second clamp 172 as well as between contact surfaces of the first and second clamps 171 and 172 and the display module 100. The jigs may be made of acid resistive synthetic resin.

Although the sealant 160 is shown in the drawings as being also provided at the sides of the display module 100 to which the masking members 170 are coupled, the sealant 160 may be provided only at the sides of the display module 100 excluding the sides to be masked by the masking members 170 in the second sealing operation because the airtight pads 174 disposed in the masking members 170 may serve as the sealant 160.

For example, when the upper and lower sides of the display module 100 are masked by the masking members 170, only some of the four sides of the display module 100, that is, only the right and left sides of the display module 100 may be sealed by the sealant 160 in the second sealing operation.

Figure 7:
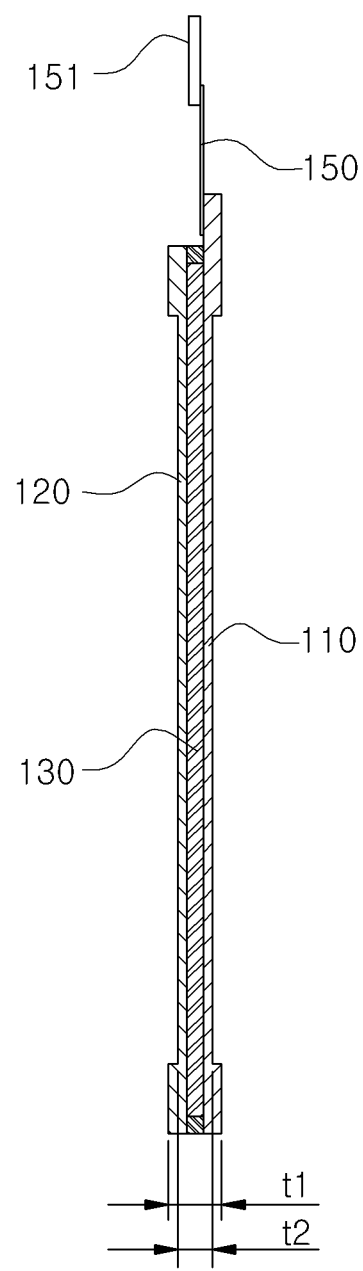
FIG. 7 is a sectional side view illustrating the display module which is secondly etched in the method of manufacturing a curved display according to the first embodiment of the present invention.

As illustrated in FIG. 7, a second etching operation is performed in such a way that the display module 100 masked by the masking member 170 is etched such that the thickness (t) of the display module 100 is reduced to a predetermined thickness (t2).

As in the first etching operation, the second etching operation may be performed in such a way as to concurrently etch the outer surface of the first substrate 110 and the outer surface of the second substrate 120 by chemical action so as to reduce the thickness (t1) of the display module 100.

In the second etching operation, since the portions of the display module 100 which are masked by the masking members 170 are not etched by etchant, the portions of the display module 100 may maintain the thickness (t1) of the display module 100 which is obtained in the first etching operation.

The reason why the display module 100 is masked is not only to make it easy to bend the display module 100 into a curved shape while gripping the masked portions of the display module 100 which have a relatively large thickness by virtue of the masking but also to protect circuit patterns concentrated at the masked portions.

For example, if the display module 100 is subjected to the first and second etching operations without masking the portions, the thickness of the display module 100 is uniformly reduced throughout the entire surfaces. When the display module 100 is bent while the opposite ends of the display module 100 are gripped in the state of the thickness of the display module 100 being uniformly reduced, there is a risk of breaking the gripped portions.

The predetermined thickness (t2) which is obtained in the second etching operation may be within a range of 0.1 mm to 0.5 mm.

If the predetermined thickness (t2) obtained in the second etching operation is less than 0.1 mm, the display module 100 may be cracked or broken because of too small thickness of the display module 100 upon bending the display module 100. Meanwhile, if the predetermined thickness (t2) exceeds 0.5 mm, it is difficult to bend the display module 100 into a desired curved shape because of too large thickness of the display module 100.

Thereafter, the masking members 170 are removed from the display module 100 which has been subjected to the second etching operation.

After removal of the masking members 170, the sealant 160 provided in the second sealing operation may be removed from the display module 100, together with the masking members 170. If the sealant 160 is not removed but is left, the manufacturing process may be simplified.

After the masking members 170 are removed from the display module 100, whether or not there is a defect in the portions of the display module 100 which have been etched in the first and second etching operations may be inspected.

Thereafter, the removed polarizing film is again adhered to the inspected display module. Here, the polarizing film may be laminated to an outer surface of the display module 100.

Figure 8:
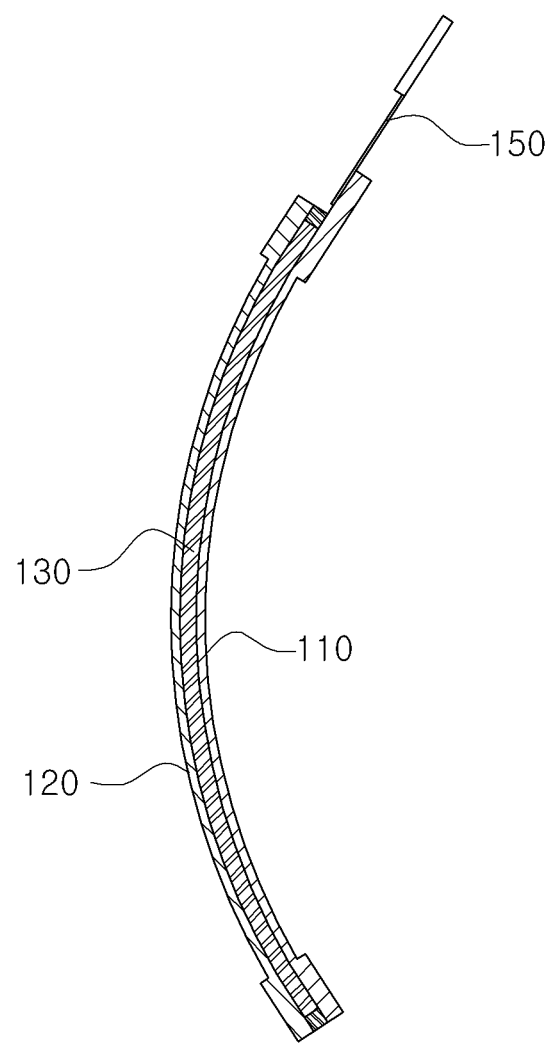
FIG. 8 is a sectional side view illustrating the display module which is bent into a curved shape in the method of manufacturing a curved display according to the first embodiment of the present invention.

After the polarizing film is adhered to the display module 100, the display module 100 is finally bent to have a desired curved surface, thus completing manufacture of the curved display, as illustrated in FIG. 8.

The curved surface may be not only a curved surface of a C shape that has only one inflection point but also a curved surface of an S shape that has two inflection points as well as a corrugated surface that has a plurality of inflection points.

Upon bending the display module 100, the display module may be bent by application of external force while the masked portions of the display module 100 are gripped.

Alternatively, the display module may also be bent in such a way as to fit and hold the display module 100 in a cover member having a desired curved shape or to attach the display module 100 to the cover member by means of adhesive.

As described above, upon bending the display module 100, the display module 100 may be bent in the state of the masked portions having relatively large thickness being gripped. At this time, the display module 100 may be bent not only about a predetermined vertical axis but also about a predetermined horizontal axis.

For example, when portions of a pair of upper and lower sides of the display module 100 are masked such that the portions of the upper and lower sides have a relatively large thickness, the display module 100 is bent with respect to the horizontal axis while the portions of the upper and lower sides are gripped, thus providing a curved display that is curved with respect to the horizontal axis.

Figure 9:
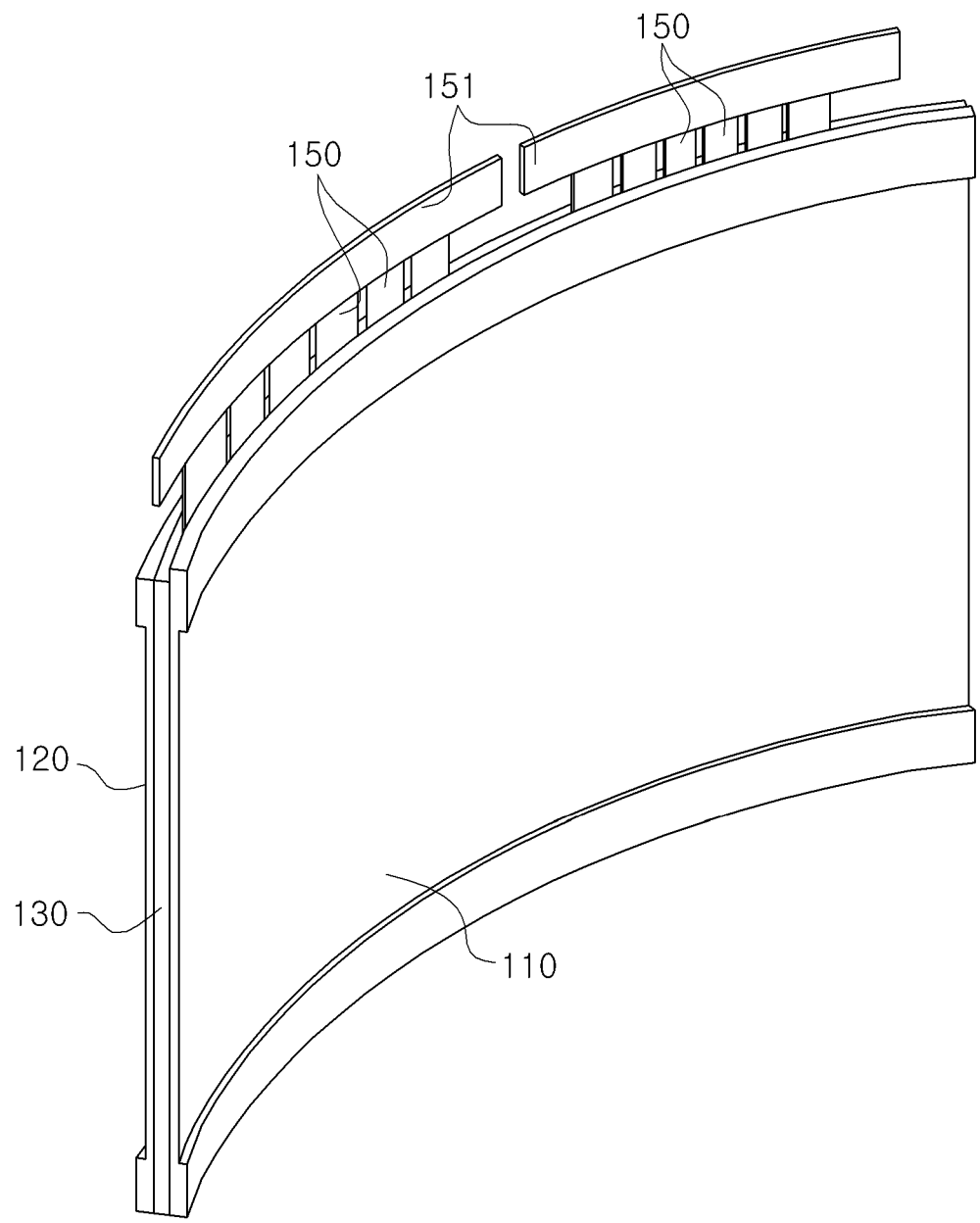
FIG. 9 is a perspective view illustrating the display module which is bent with respect to a predetermined vertical axis in the method of manufacturing a curved display according to the first embodiment of the present invention.

As illustrated in FIG. 9, the display module 100 may also be bent with respect to the vertical axis in addition to the horizontal axis, thus providing a curved display that is curved with respect to the vertical axis.

Accordingly, the method of manufacturing a curved display according to the embodiment of the present invention may easily manufacture a curved display from an existing or ready-made display module 100 and may reduce manufacturing costs of the curved display.

Since the display module 100 is subjected to the first and second etching operations in order to reliably reduce the thickness (t1) of the display module 100, yield of a curved display manufactured from the display module 100 may be improved.

Furthermore, since the etching operation is performed after provision of the acid resistive sealant 160, it is possible to prevent breakage of a display module caused by etching of the sealing material 135.

In addition, since the display module 100 may be etched even in the state of the taps 150 being attached thereto, it is possible to easily manufacture the curved display.

Second Embodiment

Components in a second embodiment which are the same as or similar to those in the first embodiment will be indicated by the same reference numerals, and detailed descriptions thereof are omitted.

A method of manufacturing a curved display according to the second embodiment of the present invention includes preparing a ready-made display module 100, and removing a polarizing film from the display module 100 if there is the polarizing film adhered to the display module 100.

Figure 10:
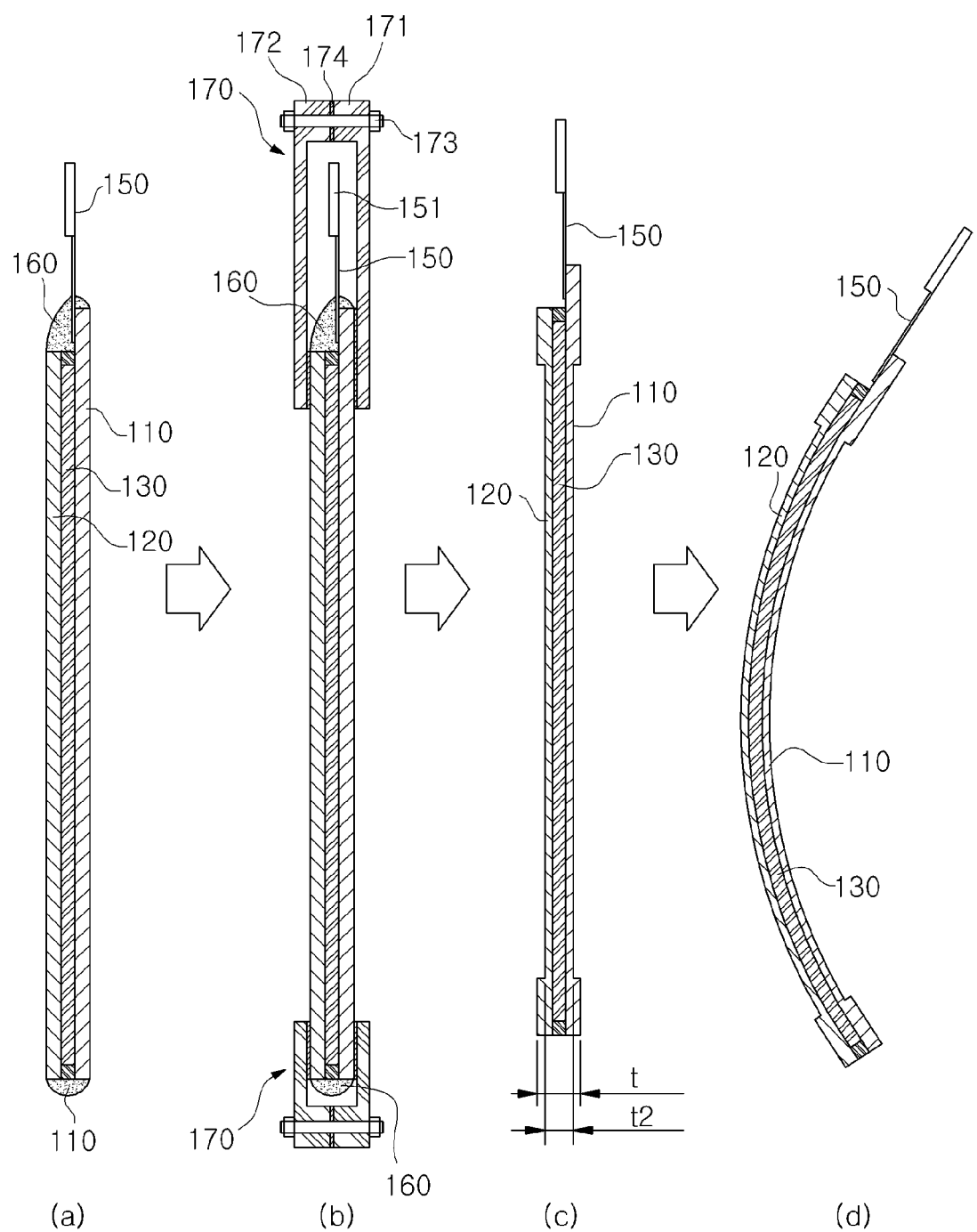
FIG. 10 is a schematic view illustrating a method of manufacturing a curved display according to a second embodiment of the present invention.

Unlike the first embodiment, in order to prevent contaminants, for example, etchant used in etching operations from infiltrating between the first substrate 110 and the second substrate 120 in the state of taps 150 being attached to the display module 100, a sealant 160 is provided at a circumference of the display module 100, as illustrated in FIG. 10(a).

The sealant 160 is the same as the sealant 160 in the first embodiment. The sealant 160 may be applied to the display module 100 in the same way as in the second sealing operation in the first embodiment.

After sealing by the sealant 160, as illustrated in FIG. 10(b), the side of the display module 100 at which the taps 150 are attached and the opposite side of the display module 100 are masked by the same masking members 170 as in the first embodiment in the same way as the masking operation in the first embodiment in order to prevent the opposite sides of the display module 100 from being etched in an etching operation which will be described later. Since the masking members and the masking operation are the same as those in the first embodiment, detailed descriptions thereof are omitted.

After the display module 100 is masked by the masking members 170, as illustrated in FIG. 9(c), the display module 100 is etched in such a way as to reduce a thickness (t) of the display module 100 to a predetermined thickness (t2).

Upon performing the etching operation, the display module 100 may be etched in such a way as to concurrently etch an outer surface of the first substrate 110 and an outer surface of the second substrate 120 by chemical action of etchant so as to reduce the thickness (t) of the display module 100.

In this etching operation, since the portions of the display module 100 which are masked by the masking members 170 are not etched by the etchant and thus remain in the initial state, the initial thickness (t) of the display module 100 may be maintained.

The reason why the masking operation is performed on the display module 100 to protect the display module 100 from the etching is to make it easy to bend the display module 100 into a curved shape while gripping the masked portions of the display module 100 which have a relatively large thickness.

For example, if the display module 100 is etched without masking the portions, the thickness of the display module 100 is uniformly reduced throughout the entire surfaces. When the display module 100 is bent while the opposite ends of the display module 100 are gripped in the state of the thickness of the display module 100 being uniformly reduced, there is a risk of breaking the gripped portions.

The predetermined thickness (t2) of the display module 100 obtained in the etching operation may be within a range 0.1 mm to 0.5 mm.

If the predetermined thickness (t2) obtained in the etching operation is less than 0.1 mm, the display module 100 may be cracked or broken because of too small thickness of the display module 100 upon bending the display module 100 into a curved shape. Meanwhile, if the predetermined thickness (t2) exceeds 0.5 mm, it is difficult to bend the display module 100 into a desired curved shape because of too large thickness of the display module 100.

After completion of the etching operation, the masking members 170 are removed from the display module 100.

After removal of the masking members 170, the sealant 160 may be removed from the display module 100, together with the masking members 170. If the sealant 160 is not removed but is left, the manufacturing process may be simplified.

After the masking members 170 are removed from the display module 100, whether or not there is a defect in the portions of the display module 100 which have been etched in the first and second etching operations may be inspected.

Thereafter, the removed polarizing film is again adhered to the display module which has been inspected. Here, the polarizing film may be laminated to an outer surface of the display module 100.

After the polarizing film is adhered to the display module 100, the display module 100 is finally bent to have a desired curved surface, thus completing manufacture of the curved display, as illustrated in FIG. 9(d).

Since the procedure of bending the display module 100 into a curved shape is the same as in the first embodiment, detailed descriptions thereof are omitted.

Furthermore, since the etching operation is performed after provision of the acid resistive sealant 160, it is possible to prevent breakage of a display module caused by etching of the sealing material 135.

In addition, since the display module 100 may be etched even with the taps 150 attached thereto, it is possible to easily manufacture the curved display.

Third Embodiment

Components in a second embodiment which are the same as or similar to those in the first and second embodiments will be indicated by the same reference numerals, and detailed descriptions thereof are omitted.

All the operations of the third embodiment are substantially identical to those of the first or second embodiment except for the masking operation.

Figure 11:
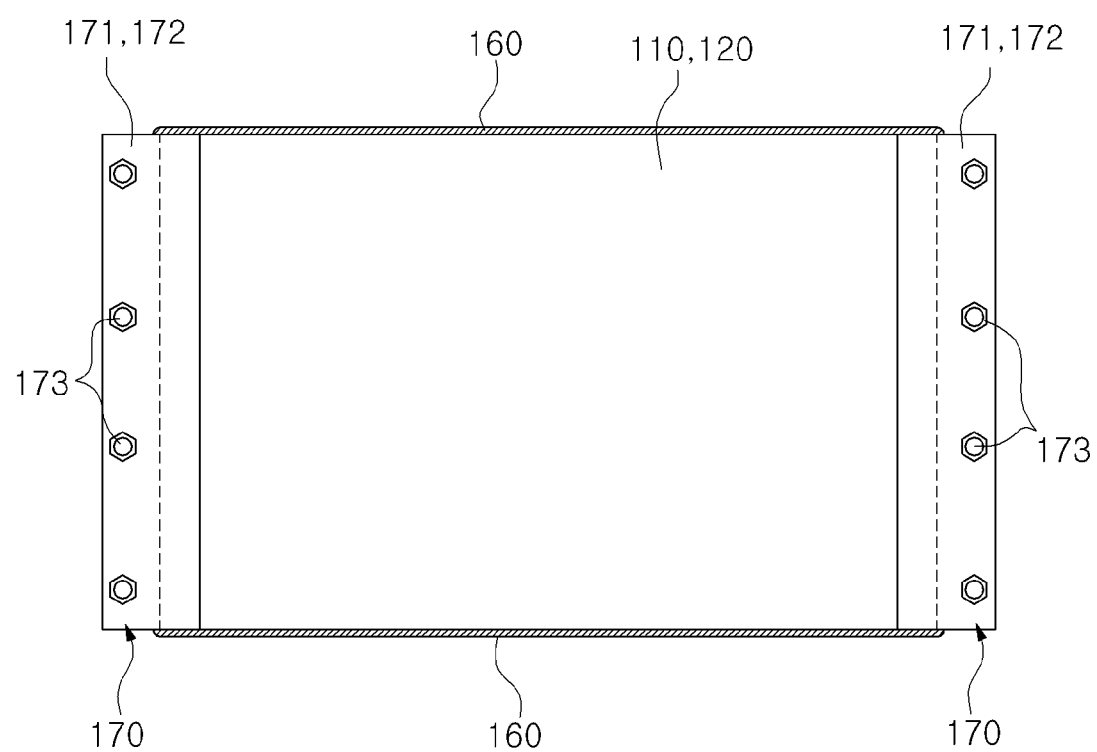
FIG. 11 is a front view illustrating a display module which is masked in a method of manufacturing a curved display according to a third embodiment of the present invention.
Figure 12:
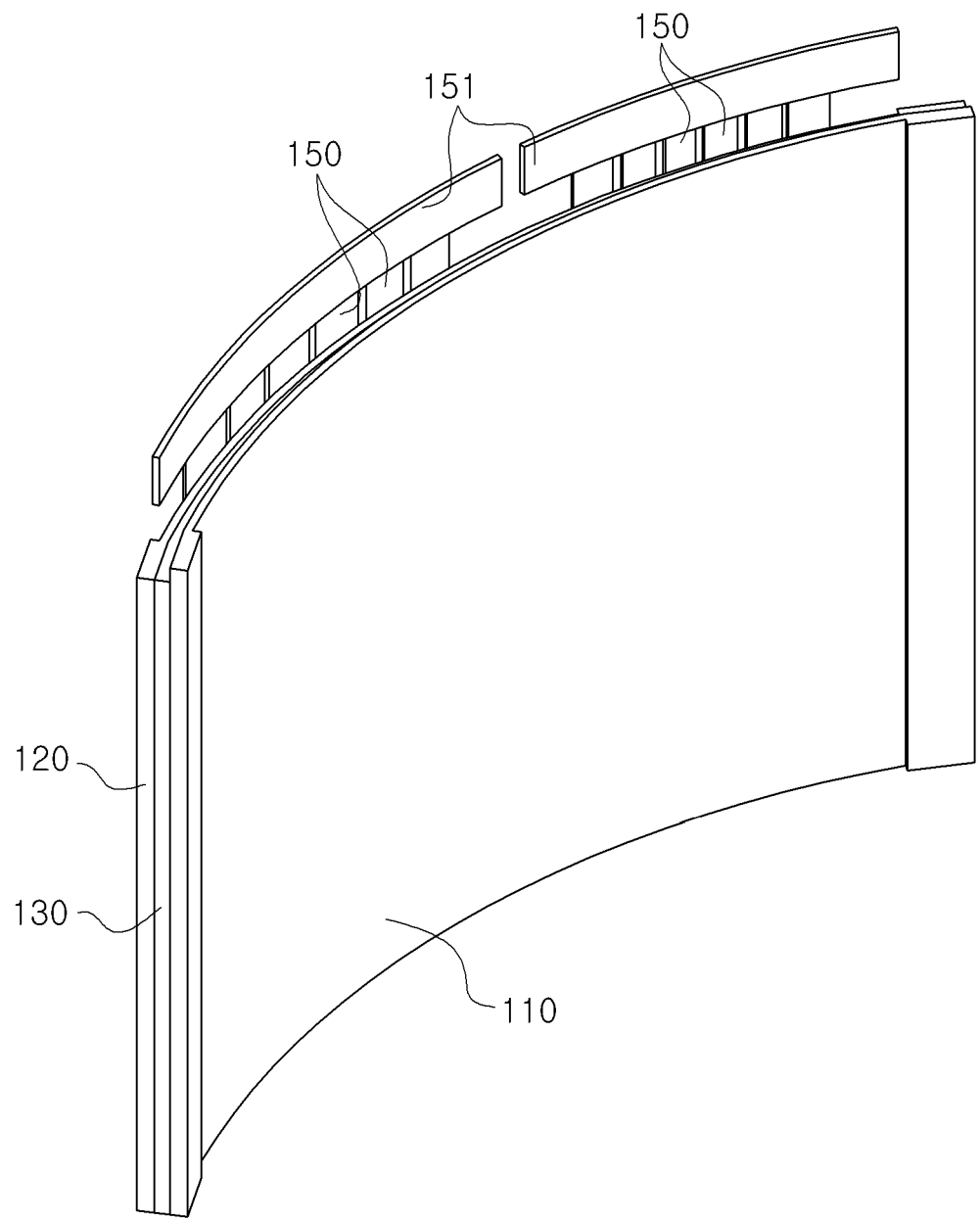
FIG. 12 is a perspective view illustrating the display module which is bent in the method of manufacturing a curved display according to the third embodiment of the present invention.

As illustrated in FIG. 11, a masking operation in the third embodiment is performed in such a way that, when the display module 100 is viewed from the front, masking members 170 are provided at right and left sides of the display module 100, respectively, rather than upper and lower sides of the display module 100 as in the second embodiment.

When the right and left sides of the display module 100 are masked by the masking members 170 in this way, the display module 100 may be bent into a curved shape with respect to a predetermined vertical axis while the right and left sides of the display module 100 are gripped, thus providing a curved display that is bent with respect to the vertical axis.

In this case, since the longer sides (upper and lower sides) of the display module 100 are bent into a curved shape while the right and left sides of the display module having a shorter length are gripped, it is possible to more easily bend the display module and it is possible to improve productivity of the curved display.

The curved surface may be not only a curved surface of a C shape that has only one inflection point but also a curved surface of an S shape that has two inflection points as well as a corrugated surface that has a plurality of inflection points.

According to the embodiment, it is possible to manufacture not only a curved display that is bent with respect to a predetermined vertical axis but also a curve display that is bent with respect to a predetermined horizontal axis.

Accordingly, the method of manufacturing a curved display according to the embodiment of the present invention may enables easy manufacture of a curved display from an existing or ready-made display module 100 and may reduce manufacturing costs of the curved display.

Since the display module 100 is subjected to the first and second etching operations in order to reliably reduce the thickness of the display module 100, yield of a curved display manufactured from the display module 100 may be improved.

Furthermore, since the display module 100 may be etched even in the state of the taps 150 being attached thereto, it is possible to easily manufacture the curved display.

In addition, since the display module 100 is bent into a curved shape while the shorter sides of the display module are gripped, it is possible to easily bend the display module and it is possible to improve productivity of the curved display.

Although preferred embodiments of the present invention have been described for illustrative purposes, it is to be understood that the invention is not limited thereto and the scope of the invention encompasses various modifications and variations that may be easily achieved by those skilled in the art.

INDUSTRIAL APPLICABILITY

The present invention is applicable to game machines, TV, monitors, and displays.

The invention claimed is:

1. A method of manufacturing a curved display from a display module including taps for electrical connection, comprising:
    applying an acid resistive sealant to a circumference of the display module excluding the taps protruding from the display module to seal the circumference;
    masking one or more of right, left, upper and lower sides of the sealed display module with masking members;
    etching the display module excluding the masked one or more of right, left, upper and lower sides to reduce a thickness of the display module to a predetermined thickness;
    removing the masking members from the etched display module; and
    bending the display module from which the masking members have been removed to have a curved surface,
    wherein the display module includes a polarizing film, and
    wherein the method further comprises removing the polarizing film prior to applying the acid resistive sealant.

2. The method according to claim 1, wherein bending the display module to have the curved surface is performed in such a way as to fit the display module in a curved cover member or to attach the display module to a curved cover module so as to bend the display module.

3. The method according to claim 1, wherein the sealant is made of a material that is in a liquid or gel phase and cures under natural conditions after a lapse of a certain period of time or by application of heat.

4. The method according to claim 1,
    wherein the taps are attached to one or more of the right, left, upper and lower sides, and
    wherein masking one or more of right, left, upper and lower sides of the sealed display module with masking members includes masking the taps by the masking members.

5. The method according to claim 1, wherein each of the masking members comprises:
    a first clamp for gripping a portion of one substrate of the first and second substrates;
    a second clamp for gripping a portion of the other substrate of the first and second substrates; and
    a fastening member for fastening the first and second clamps to each other.

6. The method according to claim 1, wherein each of the masking members is an acid resistive masking tape having an adhesive layer.

7. The method according to claim 1, wherein, in etching the display module, the predetermined thickness is within a range of 0.1 mm to 0.5 mm.

8. The method according to claim 1, further comprising attaching the removed polarizing film to the display module again between removing the masking members and bending the display module.

9. The method according to claim 1, further comprising removing the sealant after removing the masking members.

10. The method according to claim 1, wherein applying the sealant is performed by adhering an acid resistive sealing tape including an adhesive layer to portions of the display module to which the taps are attached or to which the and then applying the sealant to the circumference of the display module.

11. A method of manufacturing a curved display from a display module including taps for electrical connection, comprising:

removing the taps from the display module;

firstly applying an acid resistive sealant to a circumference of the display module from which the taps have been removed;

firstly etching outer surfaces of the display module to which the sealant has been firstly applied to reduce a thickness of the display module to a predetermined thickness;

removing the firstly applied sealant from the firstly etched display module and attaching the taps to the display module;

secondly applying the sealant to the circumference of the display module to which the taps are attached;

masking one or more of right, left, upper and lower sides of the secondly sealed display module with masking members;

secondly etching the display module excluding the masked one or more of right, left, upper and lower sides to reduce a thickness of the display module to a predetermined thickness;

removing the masking members from the secondly etched display module; and bending the display module from which the masking members have been removed to have a curved surface.

12. The method according to claim 11, wherein bending the display module to have the curved surface is performed in such a way as to fit the display module in a curved cover member or to attach the display module to a curved cover module by using an adhesive so as to bend the display module.

13. The method according to claim 11, wherein the sealant used in the first and second application is a material that is in a liquid or gel phase and cures under natural conditions after a lapse of a certain period of time or by application of heat.

14. The method according to claim 11, wherein the taps are attached to one or more of the right, left, upper and lower sides, and wherein masking one or more of right, left, upper and lower sides of the secondly sealed display module with masking members includes masking the taps by the masking members.

15. The method according to claim 11, wherein each of the masking members comprises:

a first clamp for gripping a portion of one of the first and second substrates;

a second clamp for gripping a portion of the other of the first and second substrates; and a fastening member for fastening the first and second clamps to each other.

16. The method according to claim 11, wherein each of the masking members is an acid resistive masking tape having an adhesive layer.

17. The method according to claim 11, wherein, in firstly etching the display module, the predetermined thickness is within a range of 0.6 mm to 1.1 mm.

18. The method according to claim 11, wherein, in secondly etching the display module, the predetermined thickness is within a range of 0.1 mm to 0.5 mm.

19. The method according to claim 11, wherein the display module includes a polarizing film, and wherein the method further comprises removing the polarizing film prior to firstly applying the acid resistive sealant.

20. The method according to claim 19, further comprising attaching the removed polarizing film to the display module again between removing the masking members and bending the display module.

21. The method according to claim 11, further comprising removing the secondly applied sealant after removing the masking members.

22. The method according to claim 1, wherein secondly applying the sealant is performed by adhering an acid resistive sealing tape including an adhesive layer to portions of the display module to which the taps are attached and then applying the sealant to the circumference of the display module.

* * * * *